Feb. 23, 1960

E. R. ZIEGLER 2,925,618

WINDSHIELD CLEANING SYSTEM

Filed Jan. 10, 1958

INVENTOR.
EUGENE R. ZIEGLER
BY
M. H. Strickland
HIS ATTORNEY

Feb. 23, 1960  E. R. ZIEGLER  2,925,618
WINDSHIELD CLEANING SYSTEM
Filed Jan. 10, 1958  2 Sheets-Sheet 2
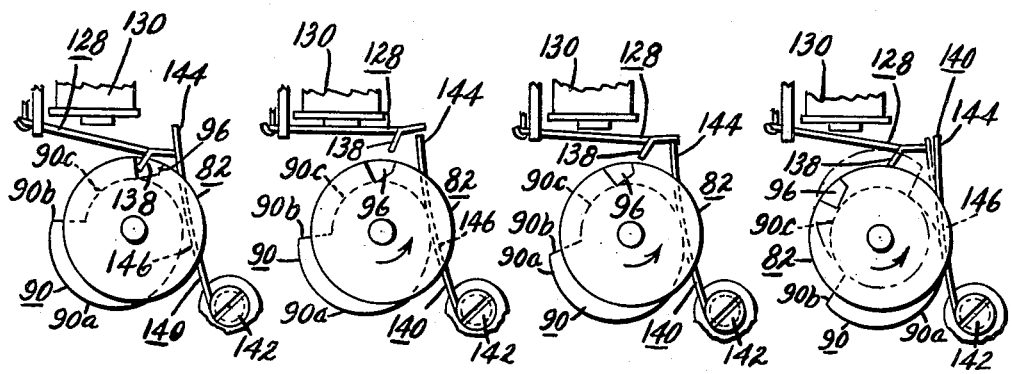
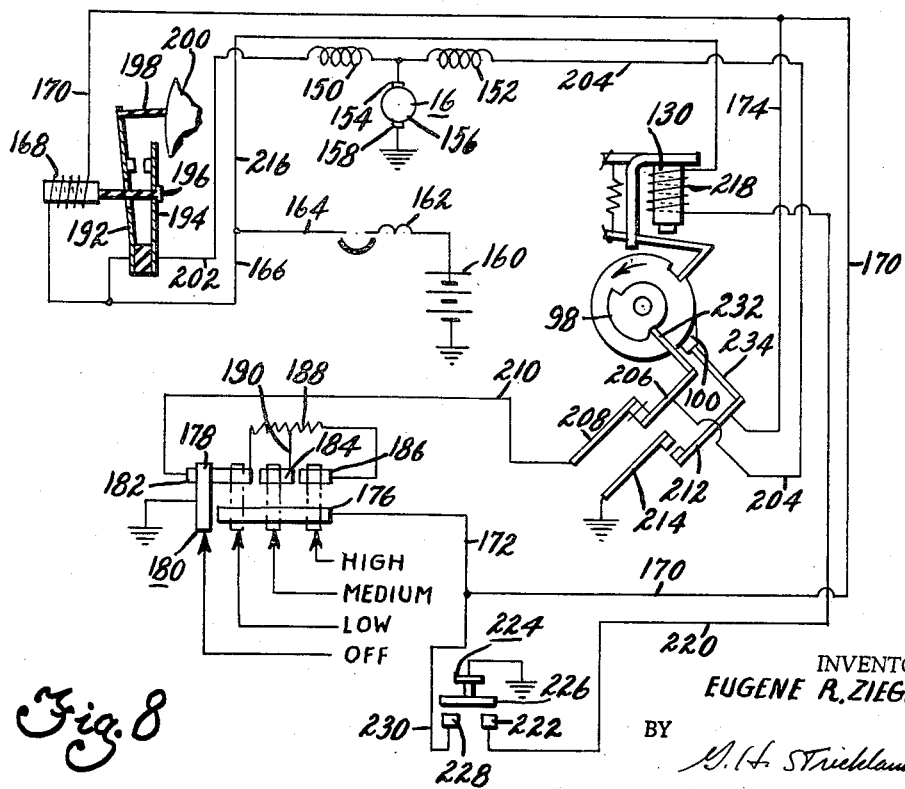
INVENTOR.
EUGENE R. ZIEGLER
BY
HIS ATTORNEY

United States Patent Office 2,925,618
Patented Feb. 23, 1960

2,925,618

WINDSHIELD CLEANING SYSTEM

Eugene R. Ziegler, Spencerport, N.Y., assignor to General Motors Corporation, Detroit, Mich., a corporation of Delaware Application January 10, 1958, Serial No. 708,197

14 Claims. (Cl. 15—250.4)

This invention relates to windshield cleaners, and particularly to means for supplying liquid solvent onto a windshield in timed relation with movement of a wiper blade thereacross.

Heretofore, it has been proposed to utilize a wiper motor for actuating a pump for intermittently squirting liquid solvent onto a windshield in timed relation with movement of a wiper blade across the windshield, the pump being operative for a first predetermined number of wiper strokes constituting a wash cycle and then automatically arrested, and the wiper motor continuing to operate for a second predetermined number of wiper strokes to dry the windshield, after which it is automatically arrested. A cleaning system of this general type is shown in copending application S.N. 674,495, filed July 26, 1957, in the name of Schmitz et al. and assigned to the assignee of this invention. The present invention relates to an improved windshield cleaning system of the aforesaid type including means for automatically continuing conjoint operation of the washer unit and the wiper unit through a second cleaning cycle upon momentary closure of the washer unit switch after completion of the first wash cycle if the driver of the vehicle does not feel that sufficient liquid solvent was applied to the windshield to adequately clean the same.

Accordingly, among my objects are the provision of a motor driven intermittent squirt type washer pump; the further provision of a washer pump operable by a wiper motor and having an interruptible driving connection with the wiper motor; the further provision of a windshield cleaning system for effecting conjoint operation of a washer unit and a wiper unit; and the still further provision of a windshield cleaning system for effecting conjoint operation of a washer unit and a wiper unit together with means for effecting a second automatic cleaning cycle of conjoint operation upon manual selection after completion of the automatic wash cycle of a previous automatic cleaning cycle.

The aforementioned and other objects are accomplished in the present invention by incorporating a cam actuated lockout spring in the automatic cycling control mechanism. Specifically, the windshield cleaning system of this invention is shown as including a wiper unit of the type disclosed in copending application S.N. 686,432, filed September 26, 1957, in the name of Harry W. Schmitz et al. and assigned to the assignee of this invention. Accordingly, the wiper unit includes a unidirectional electric motor having continuous driving connection with a crank assembly. The crank assembly has a running orbit and a parking orbit, such that during movement of the crank assembly in the running orbit, the wiper blades are oscillated throughout an angle wherein the inboard stroke end limit is above the cowl of the vehicle. When the crank assembly is operated in the parking orbit, the wiper blades are driven through the same angle, but the inboard stroke end is against the cowl of the vehicle. Moreover, suitable automatically operated parking switch means are incorporated in the energizing circuit for the motor to deenergize the motor when the wiper blades arrive at the depressed parked position against the cowl of the vehicle.

The washer unit is generally of the type disclosed in the aforementioned copending application S.N. 674,495 and comprises a flexible rubber, or rubber-like, bellows pump which is connected to a reciprocable pump rod. The bellows is engaged by a compression spring which tends to collapse the bellows and effect the delivery stroke of the pump. The pump rod can be drivingly connected with a cam follower actuated by a worm gear driven by the wiper motor. The pump rod has an interruptible driving connection with the cam follower as controlled by a ratchet cam assembly having a lockout cam portion which can be engaged by a lug on the pump rod. When the lug on the pump rod engages the lockout cam, the pump rod is restrained against movement tending to collapse the bellows, and thus the driving connection between the wiper motor and the pump may be said to be interrupted.

The cam follower is carried by a pivotally mounted lever, the cam follower being biased into engagement with the worm gear cam by a hairpin spring. A drive pawl for the ratchet cam assembly is also pivotally mounted on the lever, and is likewise biased by the hairpin spring into engagement with the teeth on the ratchet cam. In order to establish the driving connection between the wiper motor and the pump, an electromagnet must be energized. The electromagnet controls an armature constituting a ramp for preventing engagement between the drive pawl and the ratchet teeth when the ratchet cam assembly is in the "off" position. Upon energization of the electromagnet, the armature is attracted thereby so that the drive pawl can engage the ratchet teeth and impart step by step movement to the ratchet cam assembly. The electromagnet need only be momentarily energized, since the armature has a follower engageable with a cylindrical peripheral portion of the ratchet cam assembly having a notch at the "off" position of the ratchet cam assembly. All of the foregoing washer unit structure is similar to that disclosed in copending application S.N. 674,495.

The improvement of this invention comprises a wire latch out spring mounted in the housing and engageable with the lockout cam portion of the ratchet cam assembly. When the ratchet cam assembly is in the "off" position, the end of the latch out spring engages the end of the armature. Upon momentary energization of the electromagnet, the latch out spring moves into engagement with the lockout cam portion, and in so doing the end thereof is disposed beneath the armature so that upon deenergization of the electromagnet the armature is held out of engagement with the ratchet cam assembly. As the washer unit operates to intermittently discharge liquid solvent onto the windshield for a predetermined number of wiper strokes, the lockout cam forces the latch out spring outwardly, so that the end thereof is disengaged from the armature thereby permitting the armature to reengage the ratchet cam assembly. When the lug on the pump rod reengages the lockout cam and so that the lockout cam prevents reciprocation of the pump rod, operation of the pump ceases. At this time, the lockout spring is disengaged from the lockout cam so that if insufficient liquid solvent has been applied to the windshield, the driver can again momentarily energize the electromagnet, permitting the latch out wire to reengage the armature and maintain it out of engagement with the ratchet cam assembly. Thus, when the ratchet cam assembly arrives at the "off" position after completing one revolution, the armature will not fall into the slot so that the drive pawl is still operative to impart step by step movement to the ratchet cam assembly. Therefore, the ratchet cam assembly will be driven throughout a second revolution during which time liquid solvent will again be applied to the windshield for a predetermined number of strokes, after which the wiper unit will continue to operate for a second predetermined number of strokes and then be automatically arrested.

Further objects and advantages of the present invention will be apparent from the following description, reference being had to the accompanying drawings wherein a preferred embodiment of the present invention is clearly shown.

In the drawings:

Figures 4 through 7 are diagrammatic views indicating the manner in which the latch out spring is operated.

Figure 8 is an electrical schematic showing the circuits for energizing the wiper unit and washer unit.

Figure 1:
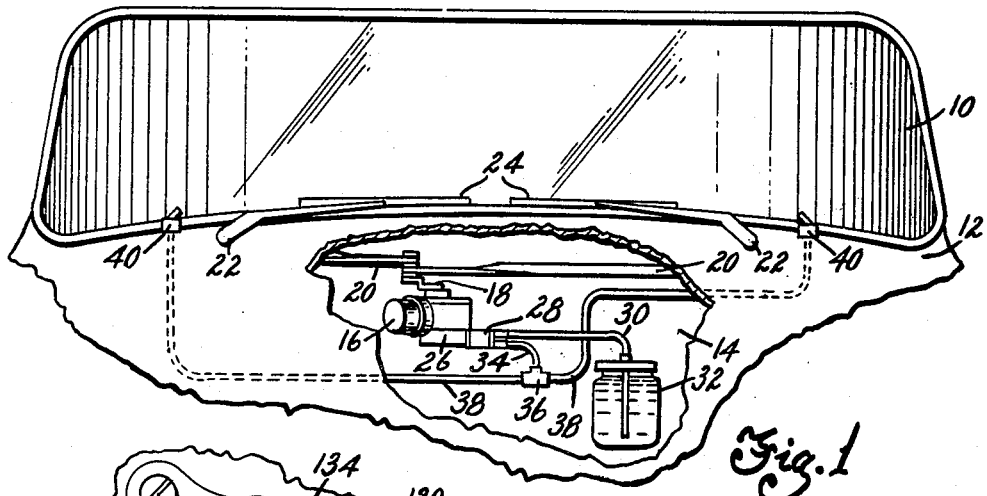
Figure 1 is a fragmentary view, partly in section and partly in elevation, of a vehicle equipped with the cleaning mechanism of this invention.

With particular reference to Figure 1, a vehicle is shown having a windshield 10, a cowl 12 and a firewall 14. The wiper unit for the vehicle windshield includes a unidirectional electric motor 16, suitably attached to the firewall 14, and drivingly connected to a crank assembly 18. The inner ends of drive links 20 are rotatably connected to the crank assembly 18, the outer end of the drive links being operatively connected to spaced pivot shafts to which wiper arms 22 are drivingly connected. The wiper arms 22 carry wiper blades 24 which may be oscillated over asymmetrical paths across the outer surface of the windshield 10. The construction of the wiper unit may be of the type shown in the aforementioned copending application S.N. 686,432.

The cleaning system also includes a washer unit comprising a washer pump 26 having an interruptible driving connection with the wiper motor 16. The pump 26 includes a check valve assembly 28 which is connected to an inlet hose 30 that communicates with a liquid solvent reservoir 32. The check valve assembly 28 also communicates with an outlet conduit 34 that is connected to a T-coupling 36. The T-coupling is connected to hoses 38 which carry the liquid solvent to washer nozzles 40. The washer nozzles 40 direct the liquid solvent into the paths of the moving wiper blades 24, in timed relation with the stroking thereof, as will be pointed out more particularly hereinafter.

Figure 2:
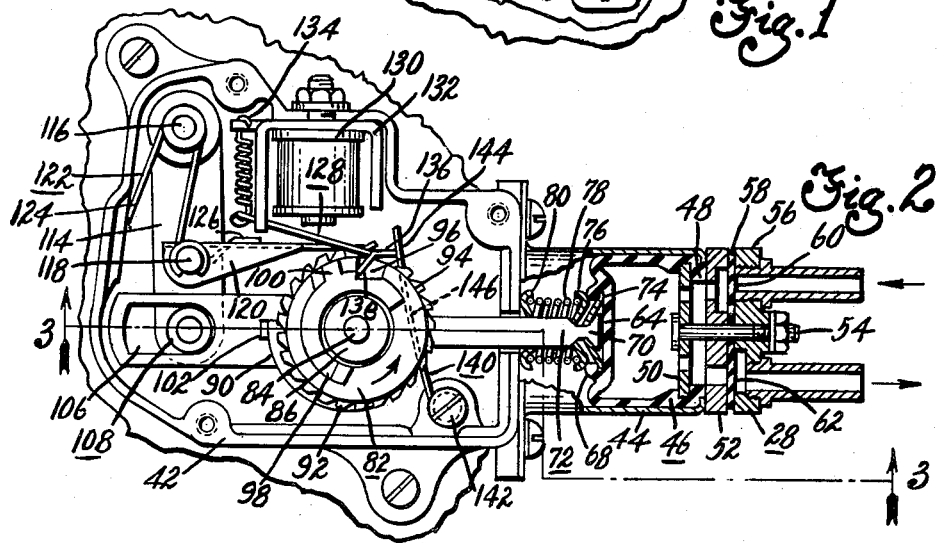
Fig. 2 is a fragmentary view, partly in section and partly in elevation, of the washer pump and control mechanism.
Figure 3:
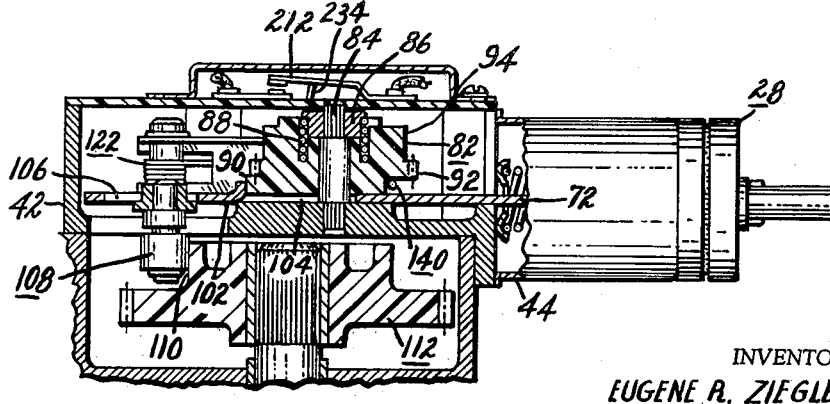
Figure 3 is a view partly in section and partly in elevation taken along line 3—3 of Figure 2.

With reference to Figures 2 and 3, the washer pump includes a drive assembly housing 42 and a bellows housing 44. The pump comprises a flexible bellows, or bulb 46 disposed within the housing 44. The open end of the bulb 46 is formed with a lip 48 which is clamped between a perforated plate 50 and a base 52 of the check valve assembly 28 by a bolt 54. The check valve assembly 28 also includes a cap 56, and between the cap 56 and the base 52 a rubber disc 58 is disposed. The rubber disc 58 has a flap-type inlet check valve 60 and a flap-type outlet check valve 62, the inlet check valve connecting with the inlet conduit 30, and the outlet check valve connecting with the outlet conduit 34.

The closed end of the bulb 46 is formed with a depression 64 and an overhanging lip 68. The enlarged end 70 of a reciprocable piston rod 72 is disposed within the depression 64. The enlarged head 70 of the pump rod 72 is rigidly connected to the bulb 46 by a pair of washers 74 and 76 disposed on opposite sides of, and embracing the lip 68. The washer 76 also constitutes a spring seat for one end of a coiled compression spring 78, the other end of which engages a spring seat 80 which circumscribes the pump rod 72 and engages the housing 42. The spring 78 is operative to collapse the bulb 46 so as to effect the delivery stroke of the pump, in the position shown in Fig. 2.

A ratchet cam assembly 82 is mounted for rotation in one direction, namely the counterclockwise direction as viewed in Figure 2, on a stub shaft 84. Referring again to Figure 3, the stub shaft 84 has a head portion 86 seated against a shoulder of the ratchet cam assembly. One end of a torsion spring clutch 88 is engageable with an abutment on the head portion 86 and the other end of the torsion spring is attached to the ratchet cam. Any rotation of the ratchet cam in the clockwise direction as viewed in Figure 2, tends to wind up the spring 88 about the shoulder of the ratchet cam to clutch it to the fixed head portion 86. However, the ratchet cam 82 is free to move in the counterclockwise direction, as viewed in Figure 2.

The ratchet cam assembly 82 has a lockout cam portion 90 which extends throughout an angle of substantially 180°, a ratchet toothed peripheral portion 92, a cylindrical peripheral portion 94 having a notch 96, and a pair of face cams 98 and 100. The pump rod 72 has an upstruck lug 102 engageable with the lockout cam 90 in the "off" position of the ratchet cam assembly, as viewed in Figure 2. The pump rod has a pair of elongate longitudinal slots 104 and 106, the stub shaft 84 extending through the slot 104 as viewed in Figure 3 so as to permit reciprocable movement of the pump rod. A cam follower assembly 108 extends through the slot 106, the cam follower assembly having a portion engageable with an integral cam 110 formed on a worm gear 112 which is drivingly connected at all times to the electric motor 16. The follower assembly 108 is attached to a lever 114 pivotally mounted on a pin 116 in the housing 42. The lever 114 also carries a pin 118 about which a drive pawl 120 is pivotally mounted. The lever 114 is urged in the counterclockwise direction, as viewed in Figure 2, to maintain the follower 108 in engagement with the cam surface 110 of the worm gear 112, by a hairpin spring 122, one end 124 of which engages the housing 42 and encircles pivot pin 116. The other end 126 of the hairpin spring encircles the pivot pin 118 and resiliently urges the drive pawl 120 into engagement with the ratchet cam assembly 82.

Accordingly, during rotation of the worm gear 112, which rotates whenever motor 16 is energized, and hence rotating, the follower 108 will be reciprocated so as to impart pivotal movement to the lever 114, which in turn reciprocates the drive pawl 120. When the lug 102 of the pump rod 72 is in engagement with the lockout cam 90, reciprocation of the cam follower 108 will not impart movement to the pump rod 72. Likewise, reciprocation of the drive pawl 120 will not impart step by step movement to the ratchet cam assembly 82 when armature 128 associated with the electromagnet 130 is in the position shown in Figure 2. The armature 128 is pivotally connected to a U-shaped frame 132 of the electromagnet, and biased into engagement with the ratchet cam by a coil spring 134. The armature 128 has a ramp portion 136 and a follower portion 138.

In the "off" position of the ratchet cam assembly 82, the follower portion 138 is located in a notch 96 whereby the ramp portion 136 of the armature 128 prevents the end of the drive pawl 120 from engaging the ratchet teeth 92. However, upon energization of the electromagnet 130, the armature 128 is moved out of engagement with the ratchet cam assembly 82, since it is attracted by the electromagnet, and hence reciprocation of the drive pawl 120 will impart step by step movement to the ratchet cam assembly 82. The electromagnet need only be momentarily energized, since as soon as the ratchet cam assembly 82 moves throughout a distance of only one tooth in the counterclockwise direction, as viewed in Figure 2, the follower portion 138 engages the cylindrical periphery 94 so as to maintain the ramp portion 136 in an inoperative position, until the ratchet cam completes one revolution and returns to the "off" position as shown in Figure 2 whereupon the slot 96 is aligned with the follower portion 138.

Moreover, after movement of the ratchet cam throughout a distance of one tooth in the counterclockwise direction, as viewed in Figure 2, the lug 102 is disengaged from the lockout cam 90, and accordingly when the cam follower 108 is at the low point of the cam 110, as viewed in Figure 3, the spring 78 will be operative to compress the bulb 46 and effect the delivery stroke of the pump. During further rotation of the worm gear 112 the cam 110 and the follower 108 will move to the left as viewed in Figures 2 and 3 so as to engage the end of the slot 106 and move the rod 72 to the left so as to expand the bulb 46 and effect the intake stroke of the pump. As long as the lug 102 is disengaged from the lockout cam the pump will be intermittently actuated to discharge liquid solvent onto the windshield in timed relation with the stroking movement of the wiper blades. Since the cam 110 is shown having two lobes, and since the wiper blades 24 make a complete revolution during each revolution of the worm gear 112, liquid solvent will be discharged onto the windshield during each stroke of the wiper blades. Moreover, since the ratchet cam assembly is moved through a distance of one tooth during each stroke of the wiper blades, the pump will be operative to discharge liquid solvent for a predetermined number of strokes dependent upon the arcuate extent of the lockout cam. Upon reengagement of the lug 102 with the lockout cam 90, the ratchet cam assembly 82 continues its step by step movement until it has completed one revolution, thus constituting a drying cycle when the wiper unit is operative and the washer unit has been previously arrested. At the end of a complete revolution of the ratchet cam assembly 82 the wiper motor will be automatically deenergized in the manner to be pointed out hereinafter.

Referring to Figures 2 through 7, the improvement of this invention comprises a latchout spring. The latchout spring comprises a wire spring member 140, one end of which is affixed by means of a screw 142 to the housing 42. The free end 144 of the latchout spring cooperates with armature 128 in a manner to be described. The intermediate portion 146 of the latchout spring is engageable with the lockout cam 90. Referring particularly to the diagrammatic views in Figures 4 through 7, the lockout cam 90 includes an eccentric portion 90a having an abrupt shoulder 90b and a concentric portion 90c. The eccentric portion 90a extends throughout an angle of substantially 180°, as does the concentric portion 90c. In the "off" position of the ratchet cam assembly 82, the free end 144 of the latchout spring engages the end of the armature 128. The intermediate portion 146 does not engage the lockout cam 90.

Upon energization of the electromagnet 130, the armature 128 is attracted thereby, as shown in Figure 5. The attraction of the armature 128 by the electromagnet 130 raises the armature and permits the intermediate portion 146 of the latchout spring 140 to move into engagement with the concentric portion 90c of the lockout cam. In addition, the free end 144 of the latchout spring is disposed beneath the end of the armature 128. Accordingly, when the electromagnet is deenergized the armature 128 will remain in the position of Figure 6.

However, as soon as the drive pawl 120 rotates the ratchet cam assembly 82 throughout a distance of two or three teeth in the counterclockwise direction, the eccentric portion 90a of the lockout cam 90 will engage the intermediate portion 146 of the latchout wire 140 and move it in the clockwise direction about the screw 142 so that the armature 128 will be disengaged from the free end 144 of the latchout spring. During continued rotation of the ratchet cam assembly 82 in the counterclockwise direction as viewed in Figure 7, the latchout wire 140 will be forced further away from the armature 128 until the latchout cam 90 arrives at the dotted line position shown in Figure 7. When the lockout cam 90 is in the dotted line position of Figure 7, the lug 102 of the pump rod 72 is reengaged with the eccentric portion 90a on the lockout cam so that the driving connection between the cam follower 108 and the pump rod 72 is interrupted. In other words, the washer unit has been arrested and during rotation of the ratchet cam assembly 82 back to the "off" position, the wiper unit alone will be operative. However, if at this point, the electromagnet 130 is momentarily energized so as to attract the armature 128, the free end 144 of the latchout spring 140 will move beneath the armature 128 so as to hold the armature 128 in the position of Figure 6. Thus, when the ratchet cam assembly 82 arrives at the "off" position, the follower portion 138 of the armature will not fall into the notch 96, and accordingly the drive pawl 120 will still be operative to engage the ratchet teeth 92 and impart movement to the ratchet cam assembly 82. Thus, the ratchet cam assembly will move throughout another complete revolution wherein the washer unit is operative for a predetermined number of strokes, after which the wiper unit remains operative for a second predetermined number of strokes to dry the windshield and will then be automatically arrested.

With reference to Figure 8, the energizing circuits for the wiper unit and the washer unit will be described. The wiper motor 16 is of the compound wound type, and thus includes a series field winding 150 and a shunt field winding 152. The inner ends of the two field windings are interconnected with a brush 154. The brush 154 engages a commutator, not shown, electrically connected to an armature 156. The other commutator brush 158 is connected to ground. The motor 16 can be energized from a battery 160, one terminal of which is connected to ground, and the other terminal of which is connected through a thermal overload switch 162 to a wire 164. The wire 164 is connected to a wire 166 which is connected to one end of a relay coil 168. The other end of the relay coil 168 is connected to a wire 170 which is connected to a wire 172, and a wire 174. Wire 172 is connected to a stationary contact 176 of a manually operable wiper unit control switch 180. The control switch 180 also includes a movable bridging contact 178 which is connected to ground, as well as stationary contacts 182, 184 and 186. Contacts 182 and 186 are connected by a resistor 188 having a center tap 190 connected to the contact 184.

The wire 166 is also connected to a leaf spring switch contact 192. The leaf spring switch contact 192 is engageable with a second leaf spring switch contact 194, these switch contacts constituting the parking switch for the wiper motor. The contact 194 can be moved to the left, as viewed in Figure 8, upon energization of relay coil 168, since it is connected to plunger 196 of the relay. The contact 192 carries a follower 198 engageable with a cam 200. The cam 200 is operable to engage the follower 198 and move the contact 192 to the position shown when the crank assembly 18 operates in the parking orbit and the blades 24 arrive at the depressed parked position against the cowl of the vehicle, as shown in Figure 1. However, during operation of the crank assembly 18 in the running orbit, the cam 200 does not engage the follower 198. Irrespective of whether the follower 198 engages the cam 200, or not, energization of relay coil 168 will attract the plunger 196 so as to cause contact 194 to engage contact 192.

The contact 194 is connected to a wire 202 connecting with the other end of series field winding 150. The other end of the shunt field winding 152 is connected to a wire 204 which is connected to a switch contact 206. The switch contact 206 is engageable with a switch contact 208 which is connected to a wire 210, the wire 210 connecting with the stationary switch contact 182. The wire 174 which connects with wire 170 that is electrically connected to a switch contact 212. The contact 212 is engageable with a contact 214 which is connected to ground. Wire 164 also connects with a wire 216 that is connected to one end of the winding 218 for the electromagnet 130. The other end of the winding 218 is connected to a wire 220. The wire 220 connects with a switch contact 222 of a washer unit push button switch 224. The washer unit push button 224 includes a bridging contact 226 which is connected to ground, as well as a second stationary contact 228 connected by wire 230 to the wire 170. The switch contact 206 carries a follower 232 engageable with a face cam 98 on the ratchet cam assembly. The switch contact 212 carries a follower 234 engageable with face cam 100 of the ratchet cam assembly, the latter also being depicted structurally in Figure 3.

The wiper motor 16 can be energized to effect independent operation of the wiper unit by manual operation of the control switch 180. As the bridging contact is moved to the low speed position, contact 176 is connected to ground, thereby completing a circuit through wires 172 and 170 to energize the relay coil 168 from the battery through wires 166 and 164, and the thermal overload switch 162. Upon energization of relay coil 168, contact 194 is moved into engagement with contact 192 so as to energize the motor 16 from the battery through overload switch 162, wire 164, wire 166, contacts 192 and 194, wire 202, series field winding 150, the brush 154, armature 156 and brush 158. The shunt field winding 152 is likewise energized from the series field winding through wire 204, switch contacts 206 and 208, wire 210 and contacts 182 and 178. As the shunt field winding is fully energized the motor rotates at slow speed, and the crank assembly 18 is automatically moved to its running orbit and the wiper blades 24 are driven throughout their wiping strokes. When the contact 178 is moved to the medium speed position, a portion of a resistor 188 is connected in series with shunt field winding 152, to reduce the energization thereof and thus increase the speed of the motor 16. When the contact 178 is moved to the high speed position, the entire resistor 188 is connected with shunt field winding 152, to further reduce the energization thereof, and thus further increase the motor speed.

When the bridging contact 178 is moved to the "off" position, the relay coil 168 is deenergized. However, the motor 16 continues to be energized until the crank assembly moves into its parking orbit and the blades 24 arrive at the parked position at which time the cam 200 will engage the follower 198 to separate contacts 194 and 192 so as to deenergize the motor. Due to the construction of the crank assembly 18 and its driving connection with the gear 112, as will be apparent from the aforementioned copending application S.N. 686,432, the worm gear 112 will make at least one-half revolution after the switch 178 is moved to the "off" position. The importance of this feature will be apparent hereinafter.

When the washer control switch 224 is momentarily closed, the relay 168 will be momentarily energized from the battery, through overload switch 162, wires 164 and 166, wires 170 and 230, switch contacts 228 and 226. Simultaneously, the electromagnet winding 218 will be energized from the battery through overload switch 162, wires 164 and 216, the coil 218, wire 220 and contacts 222 and 226. Consequently, the motor 16 will be energized and will begin rotating. Since the armature 128 has been lifted out of engagement with the ratchet cam assembly 82, the drive pawl 120 will impart step by step movement to the ratchet cam assembly. After the ratchet cam assembly has moved throughout the distance of one tooth in the counterclockwise direction, as viewed in Figures 2 and 8, the follower 234 is disengaged from the cam 100, whereupon contacts 212 and 214 are in engagement, and the relay coil 168 remains energized when the push button switch 224 is released. However, upon release of the push button switch 224 the winding 218 of the electromagnet will be deenergized. As has been previously described, deenergization of the electromagnet 130 has no effect until the ratchet cam assembly 82 makes one complete revolution. In addition, after the ratchet cam has moved throughout a distance of one tooth, follower 232 engages the face cam 98 thereby separating contacts 206 and 208 so as to deenergize the shunt field winding 152 whereby the motor will run at high speed. Since the arcuate extent of the face cam 98 is the same as the concentric portion of the lockout cam, the motor 16 will operate at high speed until the washer unit is automatically arrested by reengagement of the lug 102 on the pump rod 72 with the eccentric portion 90a of the lockout cam. Thereafter, the switch contacts 206 and 208 will reengage to fully energize the shunt field winding 152 so that the motor 16 will rotate at low speed during the automatic drying cycle.

If the push button switch 224 is not momentarily energized after completion of the wash cycle, when the ratchet cam completes one revolution and arrives at the "off" position, as viewed in Figures 2 and 8, the follower 234 will reengage the cam 100 so as to separate contacts 212 and 214. When contacts 212 and 214 are separated the relay 168 will be deenergized, and hence the crank assembly 18 will go into its parking orbit and when the blades 24 arrive at the depressed parked position, the cam 200 will disengage contacts 192 and 194 through the follower 198 so as to deenergize the motor 16.

However, if the push button switch 224 is momentarily closed after completion of the first wash cycle, the latchout spring 140 will move under the armature 128, as aforedescribed, and maintain the armature out of engagement with the ratchet cam assembly. Thus, after the ratchet cam assembly has completed one revolution, the face cam 100 will actuate the follower 234 to separate contacts 212 and 214. However, as alluded to hereinbefore, the motor 16 remains energized until the blades 24 arrive at the parked position, and such likewise requires at least one-half revolution of the worm gear 112. Therefore, the ratchet cam will be moved by the drive pawl 120 throughout a distance of one tooth in the counterclockwise direction, at which point the follower 234 no longer engages the cam 100 so that switch contacts 212 and 214 reengage thereby energizing the relay 168 so that the motor 16 will continue to be energized. The crank assembly 18 will move back into its running orbit, and a second automatic cleaning cycle will ensue. If the driver does not momentarily depress the washer unit push button switch 224 after the second wash cycle, the wiper unit will be automatically arrested with the wiper blades in the parked position after a predetermined number of strokes after the washer unit has been automatically arrested for the second time.

From the foregoing it is apparent that the present invention provides a recycling device for a windshield cleaning system having a wiper unit and a washer unit which are capable of conjoint operation for a predetermined number of wiper strokes, after which the wiper unit continues in operation for a second predetermined number of wiper strokes. The recycling device is operative to condition the cleaning system to effect another washing-wiping cycle upon momentary closure of the washer unit switch after completion of the first wash cycle portion if the driver believes that sufficient liquid solvent has not been discharged onto the windshield to adequately clean the same.

While the embodiment of the invention as herein disclosed constitutes a preferred form, it is to be understood that other forms might be adopted.

What is claimed is as follows:

1. A windshield cleaning system including, a washer unit, a wiper unit, means to set both units in operation for conjoint operation, means operable to automatically arrest the two units in sequential order that prolongs wiper operation for a predetermined number of wiper unit strokes after operation of the washer unit has been arrested, and means to condition the system to effect another cycle of conjoint operation of the washer unit and the wiper unit after the washer unit has been arrested during the first cycle, the second cycle of conjoint operation beginning only after said wiper unit has completed said predetermined number of strokes after the washer unit has been arrested during the first cycle of conjoint operation.

2. A windshield cleaning system including, a washer unit, a wiper unit, first control means to effect independent operation of the wiper unit, second control means to set both units in operation for conjoint operation, means operable to continue operation of said washer unit for a predetermined number of strokes of said wiper unit and then automatically arrest said washer unit, and means to condition the system to effect another cycle of conjoint operation of the washer unit and the wiper unit after said washer unit has been automatically arrested during the first cycle, the second cycle of conjoint operation beginning only after said wiper unit has completed a second predetermined number of wiper strokes after the washer unit has been automatically arrested during said first cycle.

3. A windshield cleaning system including, a wiper unit, a washer unit, means to set both units in operation for conjoint operation, means operable to continue operation of the washer unit for a predetermined number of strokes of the wiper unit and then automatically arrest the washer unit, said wiper unit continuing in operation after the washer unit has been arrested, and means to condition the system to effect another cycle of conjoint operation after said washer unit has been automatically arrested during the first cycle, said second cycle of conjoint operation beginning after said wiper unit has completed a second predetermined number of strokes after the washer unit has been automatically arrested during said first cycle.

4. A windshield cleaning system including a wiper unit, a washer unit, means to set both units in operation for conjoint operation, stroke counting means actuated during said conjoint operation for continuing operation of said washer unit for a predetermined number of strokes of said wiper unit and then automatically arresting said washer unit, and means to condition the system to effect another cycle of conjoint operation after the washer unit has been arrested during the first cycle.

5. A windshield cleaning system including a wiper unit, a washer unit, means to set both units in operation for conjoint operation, stroke counting means actuated during said conjoint operation for continuing operation of said washer unit for a first predetermined number of strokes of said wiper unit and then automatically arresting said washer unit, said wiper unit continuing in operation after said washer unit is arrested, and means to condition the system to effect another cycle of conjoint operation after the washer unit has been automatically arrested during the first cycle, said second cycle beginning after the said wiper unit has completed a second predetermined number of wiper strokes after said washer unit has been arrested during said first cycle.

6. A windshield cleaning system including, a wiper unit, a washer unit, a single motor operable to effect operation of both units, said motor having a continuous driving connection with said wiper unit and an interruptible driving connection with said washer unit, means to set both units in operation for conjoint operation by activating said motor and establishing the driving connection between said motor and said washer unit, stroke counting means actuated during said conjoint operation for continuing operation of said washer unit for a predetermined number of strokes of said wiper unit and then automatically arresting said washer unit by interrupting said driving connection between the washer unit and the motor, and means to condition the system to effect another cycle of conjoint operation of the washer unit and the wiper unit after said washer unit has been automatically arrested during the first cycle.

7. A windshield cleaning system including, a wiper unit, a washer unit, a single motor for actuating both units, said motor having continuous driving connection with said wiper unit and an interruptible driving connection with said washer unit, means to set both units in operation for conjoint operation by activating said motor and establishing the driving connection between said motor and said washer unit, stroke counting means actuated during said conjoint operation for continuing operation of said washer unit for a first predetermined number of strokes of said wiper unit and then automatically arresting said washer unit by interrupting said driving connection between said motor and said washer unit, said wiper unit continuing in operation as long as said motor is activated, and means to condition the system to effect another cycle of conjoint operation after said washer unit has been automatically arrested during the first cycle, said second cycle beginning after said wiper unit has completed a second predetermined number of strokes after the washer unit has been arrested during said first cycle.

8. The system set forth in claim 7 wherein said motor is an electric motor.

9. The system set forth in claim 7 wherein said washer unit includes a pump having a reciprocable pump rod, wherein said motor is drivingly connected to a cam for rotating said cam, a follower engageable with said cam and having a lost motion connection with said pump rod, and wherein said stroke counting means comprises a ratchet cam assembly having a lockout cam portion engageable with said pump rod for interrupting the driving connection between said washer unit and said motor.

10. The system set forth in claim 9 wherein said ratchet cam is driven in a step by step manner during conjoint operation of said washer unit and said wiper unit, and wherein the means to condition the system to effect another cycle includes a latchout spring actuated by said lockout cam and operative to maintain the driving connection between said pawl and said ratchet cam after said first cycle has been completed.

11. A windshield cleaning system including, a wiper unit, a washer unit having a pump, an electric motor having a continuous driving connection with said wiper unit and an interruptible driving connection with said pump, a circuit for energizing said motor and an electromagnet for establishing the driving connection between said motor and said pump to effect conjoint operation of the wiper unit and the washer unit, stroke counting means actuated during said conjoint operation for continuing operation of said washer unit for a predetermined number of strokes of said wiper unit and then automatically arresting said washer unit, and means operable upon reenergization of said electromagnet to condition the system to effect another cycle of conjoint operation after the washer unit has been arrested during the first cycle.

12. The system set forth in claim 11 wherein said stroke counting means comprises a ratchet cam assembly, and wherein said electromagnet controls the driving connection between said ratchet cam assembly and said motor.

13. The system set forth in claim 12 including a reciprocable drive pawl actuated continuously during energization of said motor, and wherein said electromagnet includes an armature constituting a ramp for preventing engagement between said ratchet cam assembly and said drive pawl when the electromagnet is deenergized, and wherein the means for conditioning the system for another cycle includes a wire spring engageable with said armature for maintaining the armature out of engagement with said ratchet cam assembly.

14. The system set forth in claim 11 wherein said stroke counting means comprises a ratchet cam assembly, wherein said electromagnet includes a movable armature for controlling driving connection between said motor and said ratchet cam assembly, said ratchet cam assembly including a cam surface for controlling the driving connection between said motor and said pump, and wherein the means for conditioning the system for another cycle comprises a spring wire engageable with said cam surface so as to be positioned thereby, said spring wire having a free end engageable with the armature of said electromagnet and maintaining it out of engagement with said ratchet cam assembly upon reenergization of said electromagnet after the washer unit has been arrested during the first cycle.

References Cited in the file of this patent

UNITED STATES PATENTS 2,816,316    Oishei  ----------------- Dec. 17, 1957